April 28, 1964  H. RICHT ETAL  3,130,934
TAPE RECORDERS
Filed April 23, 1962  2 Sheets-Sheet 1
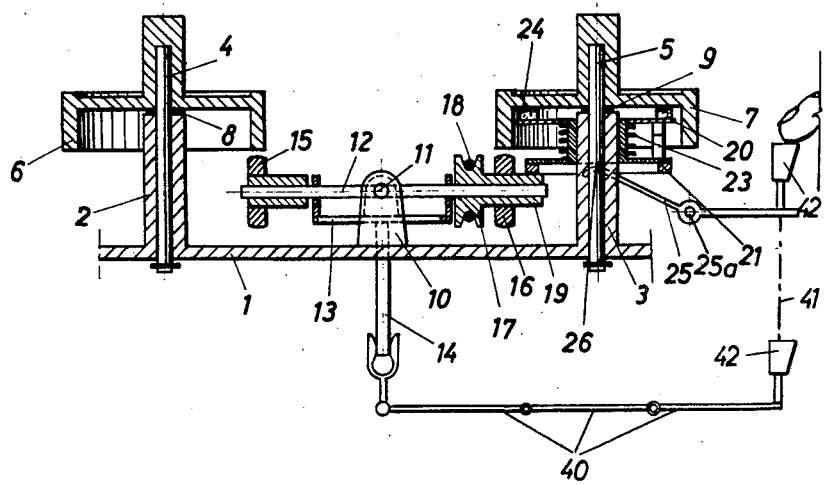
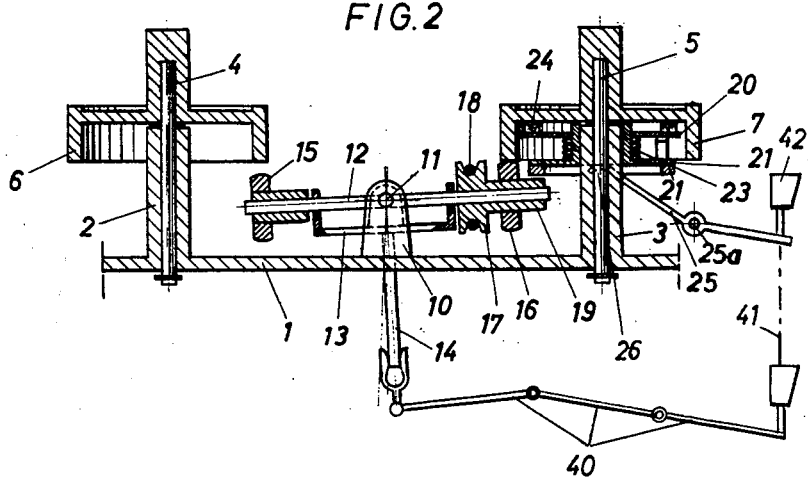
Inventors
Hubert Richt
Albert Liebl
By Stevens, Davis, Miller & Mosher
Attorneys Inventors
Hubert Richt
Albert Liebl
By Stevens, Davis, Miller + Mosher
Attorneys

United States Patent Office 3,130,934
Patented Apr. 28, 1964

3,130,934
TAPE RECORDERS
Hubert Richt, 12 Buchenweg, Socking, Germany, and Albert Liebl, 12 Am Muehleich, Starnberg, Germany
Filed Apr. 23, 1962, Ser. No. 189,445
Claims priority, application Germany Apr. 26, 1961
4 Claims. (Cl. 242—55.12)

The invention relates to a sound recorder having two disc-type reels for the tape mounted at a spacing from one another. The reels can be driven in either direction for the purpose of rapid rewinding of the sound tape. During normal operation, i.e. during sound recording or reproduction, one of the disc-type reels, namely the take-up reel, is driven via a slip coupling so that the length of tape extending between the two reels is subjected to a constant tension. During normal operation, the length of sound tape extending between the two reels is pressed against a shaft by means such as a pressure roller. The rotary speed of the shaft can be suitably set by selecting means in accordance with the various travelling speeds of the sound tape.

The shaft serves to advance the sound tape and it is known to equip the shaft with a dish-like gyratory mass whereby to stabilise its rotation and to improve the constant-speed running properties of the tape recorder. In this construction, the gyratory mass is positively driven at the same rotary speed as the shaft. It is further known tiltably to mount a motor between the two reels for the sound tape. The motor shaft carries a friction wheel on each side. By tilting the motor, one or the other friction wheel can be brought into engagement with one or the other reel for the purpose of winding up the sound tape. However, such recorders do not permit rewinding of the tape.

It is an object of the invention to arrange the gyratory mass for driving the shaft of a tape recorder in a manner so as to obtain a saving in weight and a greater degree of insensitivity of the constant speed of the shaft.

It is a further object of the invention to arrange the gyratory mass so that, with battery-operated portable appliances, the carrying movements have little or no influence on the constant speed of the tape recorder, whereby to avoid whining noises during transport or other violent movements of the sound recorder.

It is yet another object of the invention to arrange the electric motor for driving the gyratory mass, the take-up means and the rewinding means, so that a relatively large gap is obtained between the gyratory mass and the electric motor, even in small recorders. This gap is bridged by an elastic drive belt. In view of its long length, the elastic drive belt is more capable of evening out irregularities in travel.

It is a further object of the invention to construct the gyratory mass so that it also constitutes speed-change means for the rotary speed of the tape shaft.

It is a still further object of the invention to construct the gyratory mass so that it constitutes speed-change means permitting at least four different speeds for the tape shaft.

Yet another object of the invention is to provide between the reels a tiltable shaft carrying friction wheels, the arrangement being such that the friction wheels can drive the reels in both directions for the purpose of rewinding the tape as well as drive the reels for normal operation.

Further objects of the invention will become apparent from the following more detailed description with reference to the accompanying drawing, wherein:

FIG. 1 is a sectional view taken through the axes of the reels for the tape, the drive mechanism being illustrated in the position for taking up the sound tape;

FIG. 2 is a sectional view similar to that of FIG. 1, but with the drive mechanism shown in the position for rapid pre-winding;

Figures 3, 4:
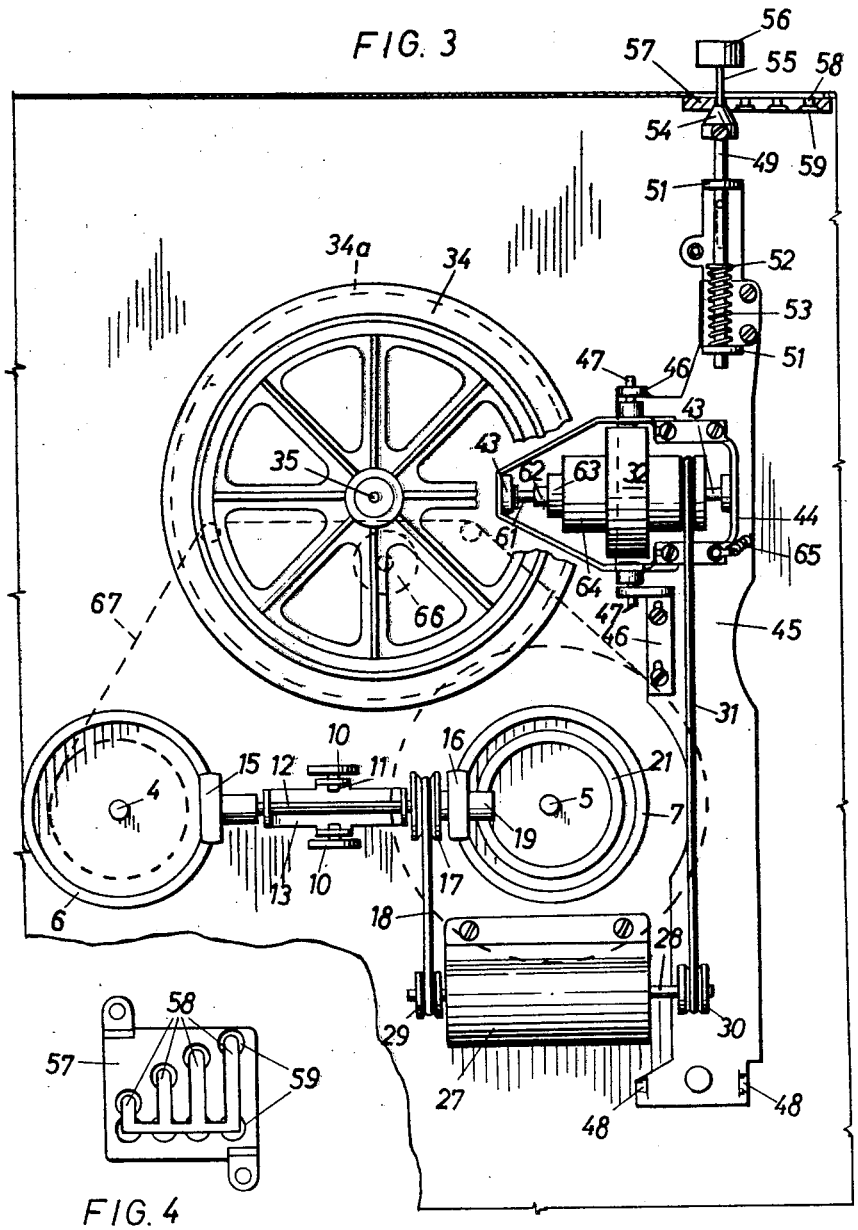
FIG. 3 is an underneath plan view of the tape recorder.
FIG. 4 is a detail view which illustrates the notched plate for changing speed.

A base plate 1 carries journals 2 and 3 receiving the pins 4 and 5 for the rotary mounting of tape reel supports 6 and 7. Tape reels are placed in the usual manner over the supports 6 and 7. The support 6 is for the pay-out reel and the support 7 for the take-up reel. A friction ring 8 is located between the reel support 6 and the journal 2, whilst a friction ring 9 is seated between the reel support 7 and the journal 3. The friction rings 8 and 9 serve to brake the non-driven reel support 6 or 7 during rapid pre-winding or rapid re-winding of the sound tape.

Between the journals 2 and 3, the base plate 1 carries two upstanding lugs 10 each having a stub shaft 11. A shaft 12 is rotatably mounted in a bridge 13. The bridge 13 is pivotable about the stub shafts 11. This pivotal or tilting movement is controlled by an actuating rod 14. The actuating rod 14 extends through a slot (not shown) in the base plate 1. The actuating rod 14 has three rest positions, namely the central position and the two end positions.

Keyed to the shaft 12 there are friction wheels 15 and 16 which come to engage the lower front edge of the reel support 6 or 7 when the rod 14 is in one of its respective end rest positions. The shaft 12 further carries a pulley 17 driven by a belt 18. Associated with the pulley 17 there is a further tubular friction wheel 19 which, as hereinafter explained, drives the take-up reel support 7 during the recording and reproducing operations of the recorder. For this purpose, a clutch disc 20 is mounted for wobbling motion on the journal 3 and a drive disc 21 is mounted for axial displacement, also on the journal 3. Between the clutch disc 20 and the drive disc 21 there is a spring 23 which presses the drive disc 21 against the friction wheel 19 of the drive shaft 12, such friction wheel 19 serving for the normal operation of the recorder. The clutch disc 20 is provided with an annular friction lining 24. The spring 23 presses the friction lining 24 of the clutch disc 20 against the inner front face of the take-up reel support 7. Accordingly, during the normal take-up operation, as illustrated in FIG. 1, the friction wheel 19 drives the take-up reel support 7 through the drive disc 21 and the clutch disc 20.

A lever 25 is rotatably mounted at a fixed point 25a of the tape recorder. One arm of the lever 25 carries an abutment 26 which is supported against the drive disc 21. The lever 25 is connected to the actuating rod 14 by connecting linkage 40 and 41 in such a way that the drive disc 21 is lifted out of engagement with the associated friction wheel 19 during the operating functions "rapid rewinding" and "stop." This position is illustrated in FIG. 2 but during normal operation (FIG. 1) it is pressed against the friction wheel 19 by the spring 23. Actuation of the lever 25 and the rod 14 can take place through an actuating key 42 acting on the connecting means 41.

An electric motor 27 having a shaft 28 is mounted in front of the take-up reel support 7 parallel to the shaft 12. At both ends of the shaft 28 of the electric motor 27 there is seated a pulley 29 and 30, the bolt or cord 18 driving the shaft 12 being guided over the pulley 29.

A drive belt 31 runs over the pulley 30 and this belt 31 drives a gyratory mass 32. The gyratory mass 32 has a shaft 43 which is rotatably mounted in a bow 44. A longer lever 45 carries two brackets 46 forming journal bearings 47 for the bow 44. The lever 45 is loosely held at 48 by means which are not illustrated in detail. At its end opposite to the loose mounting 48, the lever 45 carries a bolt 49 which is slidably mounted in the bearings 51. The bolt 49 is subjected to the action of a spring 53 supported between one of the bearings 51 and a ring 52 placed over the pin 49. At its front end, the pin 49 carries a cone 54 as well as an attachment 55 with an actuating handle 56. The attachment 55 is guided by a notched plate 57 having slots 58 and crests 59 (see FIG. 4).

The gyratory mass 32 has zones of different diameters 61, 62, 63, and 64. By pivoting the lever 45 by means of the actuating handle 56, each of the zones 61 to 64 can be brought into engagement with the projecting edge 34a of a plate 34. The appropriate applying pressure is exerted by a spring 65 which tends to pivot the bow 44 about its pivot pin 47. The plate 34 is connected to a capstan 35 against which the length 67 of tape extending between the pay-out reel support 6 and the take-up reel support 7 is pressed by a pressure roller 66 during the normal operating functions of recording and reproduction. Actuation of the pressure roller 66 takes place in known manner and with known means which are not illustrated.

Tests have shown that the illustrated tape recorder has excellent constant speed properties. This can be attributed to the fact that the very rapidly rotating gyratory mass 32 stabilises the rotary speed of the capstan 35 extremely well. Irregular movements of the motor 27 are filtered out by the long elastic belt 31 and thus do not reach the capstan 35. The running speed properties of the equipment are further improved by the fact that the clutch disc 20 is mounted for wobbling movement and thus uniform pressure is obtained between the friction lining 24 and the inner face of the take-up reel support 7. In the illustrated embodiment, the tape recorder has four different travelling speeds for the tape 67 corresponding to the four steps 61 to 64 of the gyratory mass 32. The mechanical expenditure for such a versatile appliance is surprisingly low.

We claim:
1. In a tape recorder having a pair of reels carried upon spaced shafts, sound tape windable from one reel to the other by rotation of said reels, a driving capstan and means effective to bring said capstan into contact with the length of tape extending between the reels; the combination of reel rotating means for winding and unwinding said tape from the reels and effective to hold the length of tape extending between said reels under a substantially constant tension and to accelerate reel rotation as said capstan engages the tape for movement, said reel rotating means comprising a drive shaft extending between said reels, at least three friction wheels mounted on said drive shaft, bearing means effective to tilt said drive shaft so that a selected friction wheel engages one of said reels, a disc-type drive plate connected to said capstan, a gyratory mass having zones of different diameters, and speed-change means for said tape effective to move said gyratory mass to a selected position in which one of said zones of said gyratory mass engages said disc-type drive plate, said gyratory mass being rotated at a speed substantially higher than the speed of said capstan.

2. The tape recorder defined in claim 1, wherein the drive shaft carries a belt-driven pulley.

3. In a tape recorder of the kind having a pay-out reel and a take-up reel carried upon supporting studs, a length of tape extending between the reels and unwindable from said pay-out reel and windable on to said take-up reel by rotation of said reels, a driving capstan and means effective to bring said capstan into contact with the unwound tape between said reels, the features of a disc-type drive plate connected to said capstan, a gyratory mass, means effective to bring the said gyratory mass into engagement with said disc-type drive plate, said gyratory mass being revolvable at a speed substantially higher than the speed of said capstan, reel rotating means, an electric motor for driving said gyratory mass and the reel rotating means, said reel rotating means comprising a drive shaft extending between said pay-out reel and said take-up reel, bearing means effective to tilt the drive shaft, a first friction wheel mounted on said drive shaft adjacent said pay-out reel, a second friction wheel mounted on said drive shaft adjacent said take-up reel, a plate shiftably mounted on said supporting stud for said take-up reel, a third friction wheel mounted on said drive shaft adjacent said plate, spring means urging said plate on to said third friction wheel, and retaining means for disengaging the plate from said third friction wheel.

4. In a tape recorder of the kind having a feed reel and a take-up reel carried upon supporting studs, a length of tape extending between said reels and unwindable from said feed reel and windable on to said take-up reel by rotation of said reels, a driving capstan and means effective to bring said capstan into contact with the unwound tape between said reels; the features of an electric motor arranged close to said take-up reel so that said take-up reel is located between said electric motor and said capstan, said motor having a shaft, a pulley on each free end of said motor shaft, reel rotating means driven by a first driving belt via one of said pulleys, a gyratory mass driven by a second driving belt via the other of said pulleys, a disc-type drive plate connected to said capstan, said gyratory mass having steps of different diameter for engagement in said disc-type drive plate, speed-change means for said tape effective to move said gyratory mass into a selected position in which one of said steps engage said disc-type drive plate, said gyratory mass being rotated at a speed substantially higher than the speed of said capstan, said reel rotating means comprising a drive shaft extending between said feed reel and said take-up reel, three friction wheels mounted on said drive shaft, bearing means effective to tilt said drive shaft, a plate shiftably mounted on said supporting stud for said take-up reel, a slip clutch arranged between said plate and said take-up reel, spring means effective to press said plate to one of said friction wheels, and retaining means for disengaging said plate from said friction wheel.

References Cited in the file of this patent
UNITED STATES PATENTS

| | | |
|---|---|---|
| 3,038,678 | Papst | June 12, 1962 |
| 3,050,225 | Ulman | Aug. 21, 1962 |